United States Patent

[11] 3,600,668

[72] Inventor Leon J. Goldberg
 Schenectady, N.Y.
[21] Appl. No. 7,790
[22] Filed Feb. 2, 1970
[45] Patented Aug. 17, 1971
[73] Assignee General Electric Company

[54] TIME RATIO SOLID STATE VOLTAGE REGULATOR
 8 Claims, 6 Drawing Figs.
[52] U.S. Cl. .................................. 323/43.5 S, 323/45, 323/62
[51] Int. Cl. .................................. G05f 1/20, G05f 1/30
[50] Field of Search .................................. 321/47; 323/18, 24, 25, 43.5 S, 45, 62

[56] References Cited
UNITED STATES PATENTS
3,195,038 7/1965 Fry .................................. 323/25
3,281,652 10/1966 Perrins .................................. 323/43.5 S Primary Examiner—J. D. Miller
Assistant Examiner—A. D. Pellinen
Attorneys—John F. Ahern, Paul A. Frank, Julius J. Zaskalicky, Donald R. Campbell, Frank L. Neuhauser, Oscar B. Waddell and Joseph B. Forman ABSTRACT: The solid state switches connected to fixed taps on a voltage-injecting transformer winding in a solid state step voltage regulator or load tap changing transformer are controlled synchronously to effectively insert the winding in series with the line for a variable number of half cycles, or preferably full cycles, of a base time interval. In addition to zero and full value voltage insertions, a variable portion of the full value voltage increment is injected in series with the line voltage without increasing the number of switches.

3,600,668

Inventor
Leon J. Goldberg
by Ronald R. Campbell
His Attorney

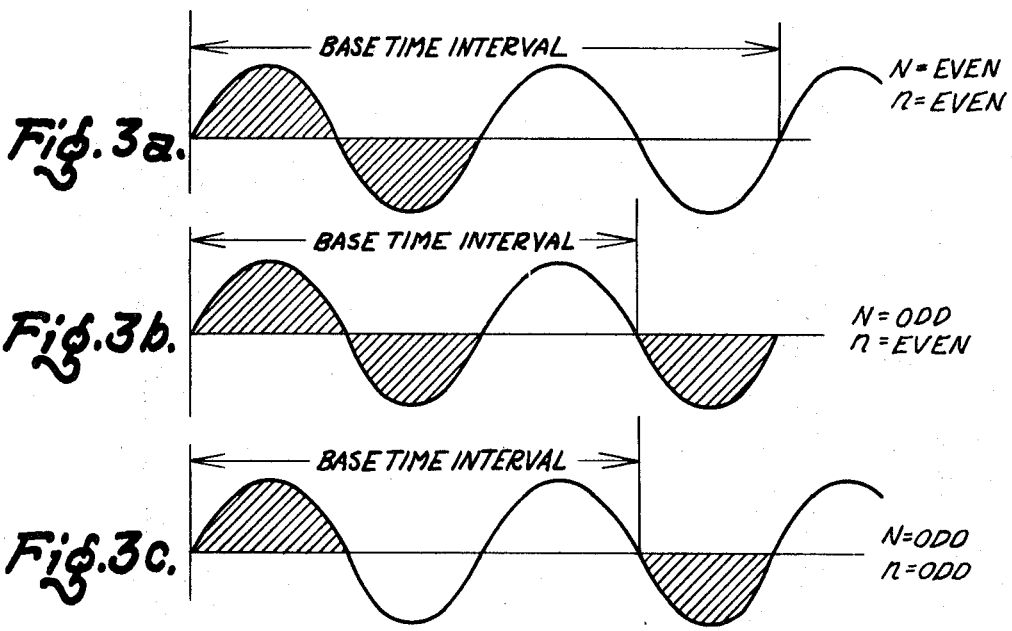
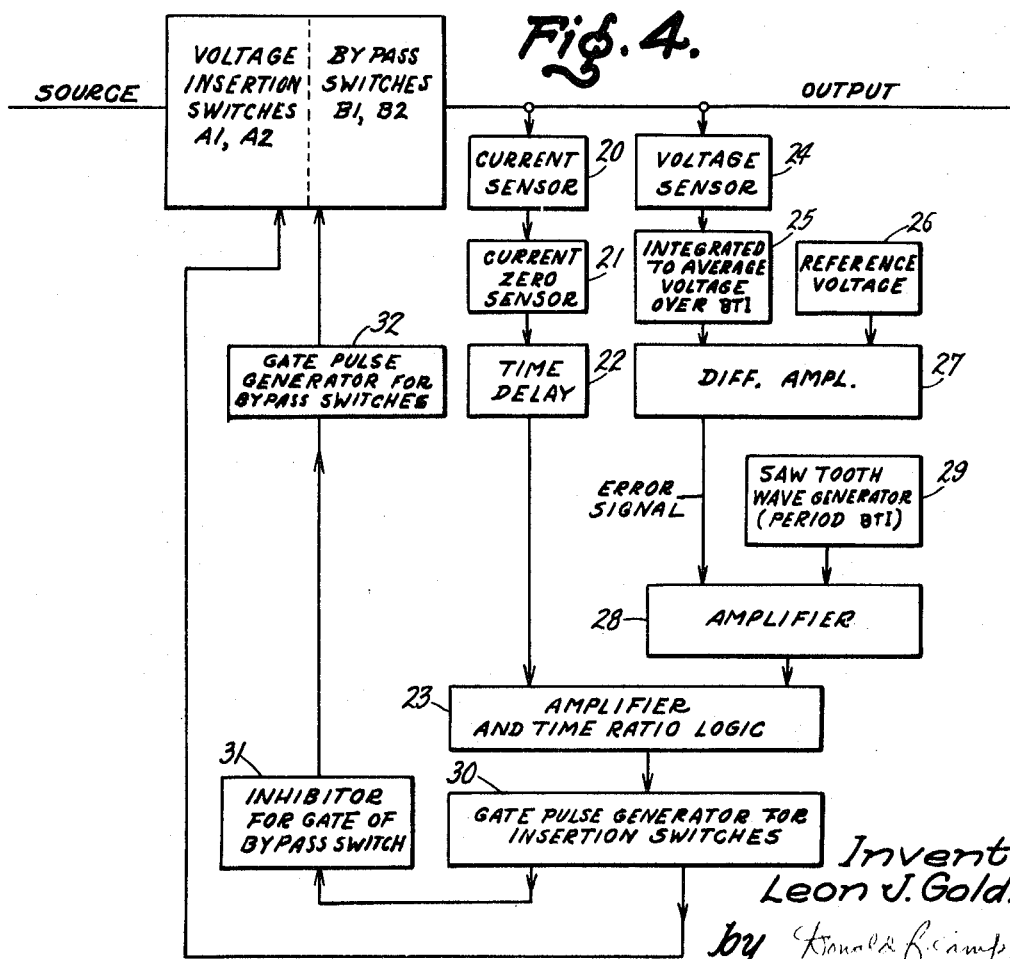

TIME RATIO SOLID STATE VOLTAGE REGULATOR

This invention relates to a solid state step voltage regulator or similar adjustable output voltage equipment having a number of solid state switches to selectively switch various combinations of voltage injecting transformer windings into series circuit relationship with a load. More particularly, the invention relates to time ratio operation of the switches to inject all or a portion of the voltage associated with an individual voltage injecting winding without increasing the number of switches.

In one form of the solid state step voltage regulator to which the invention applies, a plurality of digitally related secondary transformer windings are connected in and out of the line by means of solid state switches connected to each end of the winding and optionally to taps on the winding. An exciting winding shunting the line energizes the voltage injecting secondary windings. By rendering conductive the proper switches, the output voltage is maintained approximately constant despite changes in the input voltage, or is adjusted to a predetermined value. In another form of this type of solid-state step voltage regulator, there is a series transformer in the line, and the solid state switches are connected to the shunt secondary winding to place all or a section of that winding in series with the series transformer winding. In either case, the entire voltage-producing winding, or an undivided section of the winding bounded by taps to solid state switches, is effectively inserted in series with the line to produce a change in the output voltage. In view of the present high cost of the solid state power switches as compared to conventional electromechanical switches, there is a need to make the equipment commercially attractive, to reduce the number of solid state switches needed to produce a given number of step voltages or, conversely, to increase the number of steps available from a given number of switches.

Accordingly, an object of the invention is to provide an improved solid state step voltage regulator or other adjustable output voltage equipment in which all or a defined portion of the voltage associated with a voltage injecting winding is inserted or removed from the circuit by time ratio operation of the switches connected to the ends of the winding or winding section.

Another object is the provision of a solid state step voltage regulator characterized by the production of a plurality of selectively available step voltages from a single voltage-injecting winding or winding section when averaged over a predetermined time interval.

Yet another object is to provide a greater number of steps in a solid state step voltage regulator without increasing the number of solid state switches.

In accordance with the invention, an adjustable output voltage circuit such as a solid state step voltage regulator connected between input and output terminals includes a plurality of bidirectional conducting solid state switching means, for example, inverse-parallel pairs of silicon controlled rectifiers, and one or more voltage injecting transformer stages each having a shunt exciting winding and an inductively coupled secondary winding. Coupling means are provided for connecting the solid state switching means to fixed points or taps on the secondary winding, and for effectively inserting the secondary winding in series with an output terminal and removing the winding from the circuit, to thereby selectively inject zero and full value voltage increments synchronously in series with the input voltage to regulate or adjust the output voltage.

The improvement is made of providing time ratio means for switching the switches, preferably in the form of a time ratio synchronous gating circuit for the solid state switching means. Such a gating circuit includes means for continuously producing a base time interval that is an integral number of half cycles of the input voltage, and control means for effectively inserting the secondary winding for a variable number of half cycles or preferably full cycles of each base time interval. In this way a selected portion of the full value voltage increment, averaged over the base time interval, is inserted in series with the line voltage, i.e., the number of possible step changes is increased, without increasing the number of switches. Frequently the time ratio operated voltage injecting transformer stage is used in conjunction with a prior type stage that inserts only the zero and full value voltage increments over the base time interval.

The foregoing and other objects, features, and advantages of the invention will be apparent from the following more particular description of several preferred embodiments of the invention, as illustrated in the accompanying drawings wherein.

Figure 1:
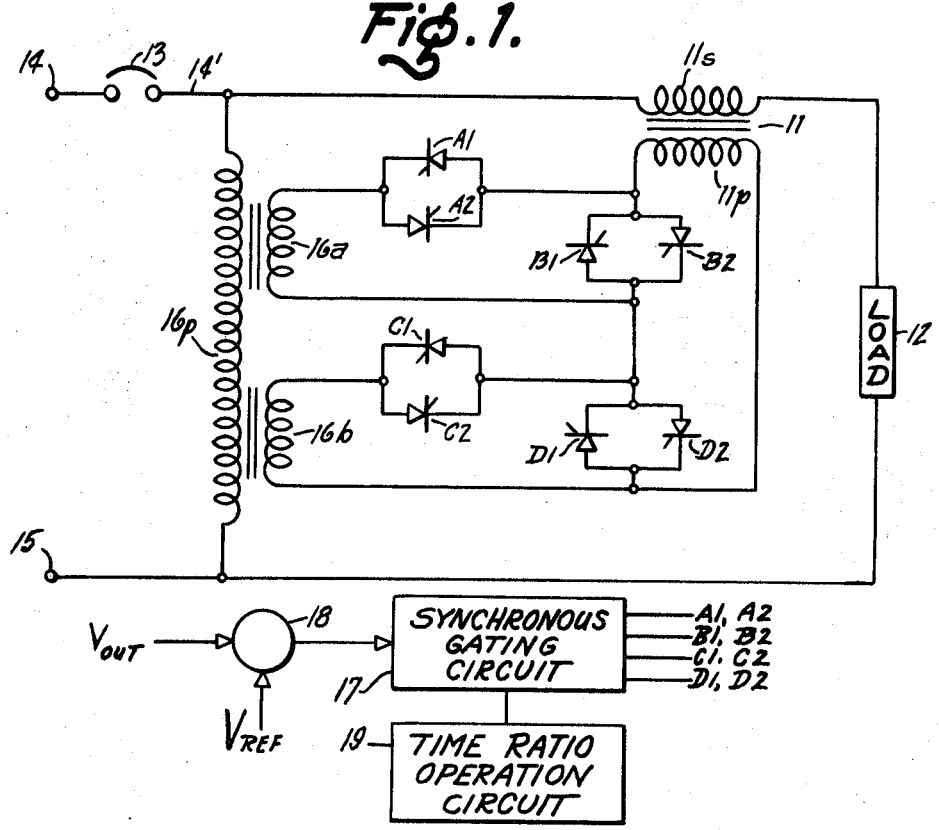
FIG. 1 is a schematic circuit diagram of an illustrative form of a solid state step voltage regulator constructed in accordance with the invention to include provision for time ratio operation of the solid state switches.

FIGS. 3 $a$, 3 $b$, and 3 $c$ are voltage waveform diagrams showing time ratio operation of the circuit for several different combinations of base time intervals and number of integral half cycles conductive during a base time interval; and FIG. 4 is a block flow diagram of a control circuit for achieving time ratio operation of the switches connected to one winding in the FIG. 1 circuit.

The solid state voltage regulator shown in FIG. 1 comprises a series regulator transformer 11 having a secondary winding 11$s$ connected in series circuit relationship with a load 12 and a conventional electromechanical line circuit breaker 13 between a pair of input terminals 14 and 15 that in turn are connected across a source of single phase alternating current potential. The equipment is ordinarily used with the commonly available 60 Hz. source but can be supplied by other low frequency power sources. The series regulator transformer 11 injects voltage increments into the load circuit to maintain the output voltage approximately constant within a predetermined range of regulation despite variations in the line voltage applied to input terminals 14 and 15. Regulators of this type are also used to adjust the output voltage to a preselected value. Energy for these voltage increments injected in the line is derived in a shunt exciting transformer having a primary winding 16$p$ connected between terminals 14' and 15. Two separate secondary exciting windings 16$a$ and 16$b$ are each connected by two bidirectional conducting solid state switches, or two pairs of inverse-parallel unidirectional switches, to the primary winding 11$p$ of series regulator transformer 11. Depending on which switch is rendered conductive, the prior art operation of the circuit is that the entire voltage associated with the voltage-injecting windings 16$a$ or 116$b$ is effectively injected in series with the line voltage, to thereby change the output voltage, or the voltage injecting winding is bypassed and a zero voltage increment is injected in series with the line voltage.

In FIG. 1 the solid state voltage insertion and bypass switches are illustrated as being inverse-parallel pairs of silicon-controlled rectifiers. Thyristors A1, A2 and C1, C2 are the respective voltage insertion switches for windings 16$a$ and 16$b$ whereas thyristors B1, B2 and D1, D2 are the bypass switches for the respective windings. Other power semiconductors such as the triac and the diac can be used in place of the pairs of silicon-controlled rectifiers. Both the triac and diac are bilateral thyristors, and the triac is similar to the silicon-controlled rectifier in that it has a gate electrode for initiating conduction, whereas the diac is a nongate-type device. In order to turn off or commutate the silicon-controlled rectifier and other similar thyristor power semiconductors, it is necessary to reduce the current through the device to a value below the holding value or to make the cathode of a device positive relative to the anode for an interval greater than the turnoff period. The need for special commutation circuits is obviated in FIG. 1 by rendering conductive the devices for complete half cycles of conduction.

For this purpose, a synchronous gating or triggering circuit 17 is provided to supply gating pulses to the appropriate pair of thyristors as required within each half cycle. Gating circuit 17 is controlled by the magnitude and polarity of the error voltage generated by comparing a predetermined reference voltage $V_{ref}$ and the instantaneous output voltage $V_{out}$ in a summing circuit 18. Suitable gating circuits that can be used are described, for instance, in the Silicon-Controlled Rectifier Manual, 4th Edition, copyright 1967, published by the General Electric Company, Electronics Park, Syracuse, New York. When the load 12 being supplied is a unity power factor load, the gating pulses are supplied and switching from a switch connected to one tap to a switch connected to another tap occurs at the natural current zero of the line current. A change in the output voltage is made at this time by inserting or removing a voltage-injecting winding, by removing the gating pulses from the voltage insertion switches and supplying gating pulses to the bypass switches, or vice versa. Gating pulses can be supplied to both pairs of silicon-controlled rectifiers in an inverse-parallel pair, or to only that thyristor which would conduct according to the circuit condition. When the load 12 being supplied is a nonunity power factor load, the synchronous transfer of conduction from one pair of switches to another occurs at a time delay (or advance) with respect to the natural current zero, at the time when the voltage on the voltage-injecting winding is passing through its zero. Synchronous switching does not occur at the natural current zero because of the fact that in a voltage regulator the current and voltage in the voltage-injecting winding do not have the same phase relation, and if the switches are inverse-parallel silicon-controlled rectifiers, there are some phase relations which would cause a transfer at the current zero to keep the off-going thyristor conductive in a circulating path. Therefore, switching is synchronous as related to the circuit transfer from one switch or pair of switches to the other switch or pair of switches, and when used with a nonunity power load is synchronous to a selected delay angle after a current zero. In either case, whether the switching circuit transfer is at the current zero or at delay angle after the current zero, a switch or pair of switches connected to a particular tap on a voltage injecting winding or winding section is conductive for only complete half cycles of the source alternating current.

Figure 2:
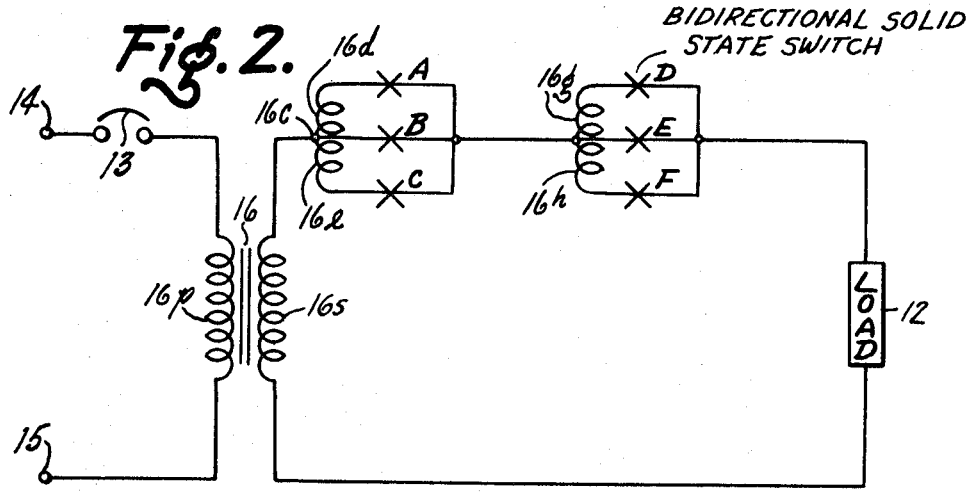
FIG. 2 is a schematic circuit diagram of a load tap changing transformer with a different arrangement of windings and switches to which the invention is also applicable.

There are numerous other possible arrangements of the voltage-injecting windings and switches, operated to obtain similar results, to which the invention is also applicable. In FIG. 2 is shown by way of illustration a load tap changing transformer in which the stages and the connection in the circuit to make voltage injections is different from FIG. 1. In this form of the voltage injecting stages, series regulator transformer 11 in the line is not used, and the secondary voltage-injecting windings instead are inserted directly in series with the load. Two stages are illustrated, each comprising a center-tapped voltage-injecting winding having three taps each connected to a bidirectional conducting solid state switch or a pair of inverse-parallel switches indicated by the symbol X. EAch stage is therefore capable of producing both additive and subtractive voltage increments as well as the zero voltage increment. The two pairs of voltage injecting windings 16d, 16e and 16g, 16h are both magnetically coupled to shunt exciting winding 16s, which is in turn coupled to the primary winding 16p of load transformer 16. Different values of total injected voltage are obtained by making the voltage spans of the stage windings different from one another. For example, the first stage produces (+1) (0) (−1) voltage increments, and the second stage (+3) (0) (−3) voltage units. Assuming that the entire voltage associated with a particular winding section is inserted or removed, according to the prior art teaching, this two-stage regulator, by rendering conductive different combinations of switches A—F, has a range from +4 through zero to −4 injected voltage units in steps of one unit each.

Thus as theretofore known, a fixed voltage increment is switched in or out of the circuit, for each voltage-injecting winding section provided. The innovation of the present invention is that a variable portion of the voltage associated with each voltage-injecting winding or section winding is inserted or removed from the circuit, when averaged over a small time interval, and this is done without increasing the number of step-changing solid state switches. To achieve this mode of operation, the switches associated with a voltage-injecting winding are controlled to connect that winding in the circuit for a fraction of a base time interval and to do this repetitively for as many contiguous base time intervals as desired. Within a base time interval comprising an integral number of half cycles, the step-changing switches are rendered conductive for a variable number of half cycles, and the effective injected voltage over the base time interval is determined by the ratio of the number of half cycles of conduction to the number of half cycles in the base time interval. This is known as time ratio operation or proportional control of the solid state switches. Hence, in FIG. 1 the improvement is achieved in simple terms by the addition of a time ratio operation circuit 19 for controlling synchronous gating circuit 17.

The principle of time ratio operation of the switches connected to a voltage injecting winding is illustrated in FIGS. 3a–3c for various combinations of number of integral half cycles in the base time interval, N, and number of integral half cycles during which the switches are conductive, n The conductive half cycles are shaded. In FIG. 3a the base time interval is four half cycles and when two half cycles are conductive as shown, the effective average value of voltage insertion is one-half the full voltage increment winding value. If the switches conduct for only one half cycle in each base time interval, then the effective average value of voltage insertion is of course one-quarter of the full value, and is three-quarters of the full value if the switch is conductive for three half cycles in each base time interval. Consequently, there are a maximum of four values of voltage insertion for that winding. Another consideration, however, is the avoidance of a DC component in the voltage-injecting transformer. In FIGS. 3a and 3b, N, the number of half cycles in a base time interval, is respectively even and odd, whereas in both cases n, the number of conductive half cycles, is even. In FIGS. 3a and 3b, then, no DC component is produced. In FIG. 3c both N and n are odd, but the DC component in adjacent base time intervals balance one another, thus being equivalent to a low frequency AC. This is usually tolerable and not as undesirable as the case when N is even and n is odd, which produces a true DC component assuming that all base time intervals and patterns of conduction within the intervals are identical. Although a DC component can be tolerated if it is small, as would be true if the amount of voltage regulation were small, in general the preferred form is one without the DC component such as is shown in FIGS. 3a and 3b. These require that the switches which insert the voltage-injecting winding into the circuit be conductive for pairs of half cycles, so that once turned on the switch conducts for one or more complete cycles, rather than half cycles. This operating characteristic is obtained by providing in the gating control circuit a circuit element which senses polarity of the current or the rate of change of current as it approaches the current zero just preceding the desired moment of transfer from one pair of switches to the other pair of switches.

The permissible length of the base time interval, and of the on-off intervals within a base time interval, depends upon the character of the load being supplied. For example, when regulated voltage is being supplied to a large heating load having a thermal time constant of many seconds, the base time interval and on-off intervals within it can be many cycles or a few seconds long. For general purpose regulation, however, such as on a utility distribution line, a limiting factor is that these intervals should be short so as to minimize or eliminate objectionable light flicker on the load circuits. Studies on incandescent lights have been published that show that light flicker is approximately unnoticeable for voltage fluctuations of 1 percent if they occur faster than about 20 times per second, and are unobjectionable to the average person if they occur faster than about 13 times per second. Three half cycles conducting, three half cycles nonconducting results in a flicker of 20 times per second, and four half cycles on-off gives a flicker faster than 13 per second.

The advantage of the invention in producing a greater number of step changes over the base time interval without increasing the number of switches will be illustrated with regard to FIG. 1. Assume that voltage-injecting winding 16a is a 4 percent winding, while winding 16b is a 5 percent winding. Only winding 16a is operated according to time ratio principles, and for a base time interval of eight half cycles, i.e., N=8, the effective insertion values for full cycle steps are 0, 0.25, 0.50, 0.75, and 1.0 of the increment maximum. For a 4 percent winding, the effective voltage insertions are in 1 percent steps. The worst light flicker occurs at the condition of equal on-off periods of the increment, which is four half cycles each. This produces an acceptable light flicker. The separate 5 percent winding 16b is switched full on or off to provide a total of 9 percent in 1-percent steps. When both windings are switched full on or full off according to the prior art operation, only zero, 4 percent, 5 percent, and g-percent selections are possible.

As another example, let all four winding sections in FIG. 2 have a maximum voltage insertion value of +3 or -3 volts, as the case may be. By operating the first stage according to time ratio principles as herein described, with a base time interval of six half cycles and assuming integral complete cycles of conduction, there are now the possible voltage selections for that winding +3 volts to -3 volts in 1-volt steps. The voltage span of the entire regulator is then +6 volts to -6 volts in 1-volt steps. This compares to the range of ±4 volts for the example previously given. For each example, there is an increase in the number of possible step changes, when considered over the length of the base time interval, without increasing the number of switches. Synchronous gating circuits for thyristors operated according to time ratio or proportional control principles are known generally in the art. For further information, reference may be made for instance to Chapters 8 and 12 of the aforementioned GE SCR Manual or to U.S. Pat. Nos. 3,381,226 and 3,486,042. Specific time ratio gating circuits preferably constructed with solid state components can be designed following the prior art teaching. Reference may also be made to the Transistor Manual, 7th Edition, Copyright 1964, published by the General Electric Company (see especially chapters 5 and 7 on logic and digital circuitry).

FIG. 4 shows a block flow diagram of one possible form of the time ratio gating circuitry as applied to FIG. 1 for time ratio operation of the switches connected to voltage-injecting winding 16a. It is assumed that a separate synchronous gating circuit is provided for the switches connected to winding 16b, and that this winding is either inserted or removed from the circuit throughout the entire base interval. The current at the output of the voltage regulator is sensed by a suitable current sensor 20 and the current zero is determined by a current zero sensor 21. The current zero signal is delayed by a selected amount by time delay circuit 22 and supplied as an input to amplifier 23. At the same time, the output voltage is sensed by an appropriate voltage sensor 24 and is integrated to an average voltage over the base time interval by an integrator circuit 25. The average output voltage so obtained is compared with a reference voltage supplied by circuit 26 in a differential amplifier 27, and the error signal is fed to an amplifier 28. A sawtooth wave generator 29 having a period equal to the base time interval is another input to amplifier 28. The output from amplifier 28 is thus an error signal which is constant over each base time interval or is derived at the beginning of the base time interval.

Amplifier 23, in addition to being supplied with information as to the time delay following each current zero as well as the magnitude of the error voltage, has time ratio logic for determining which of the switches is to be supplied with gating pulses at the beginning of each half cycle. A gate pulse generator 30 for the voltage insertion switches supplies gating signals as need to switches A1, A2. Each associated bypass switch is, of course, nonconductive while its associated voltage insertion switch is conducting. Accordingly, gate pulse generator 30 also supplies an output signal to an inhibitor circuit 31 for the gates of bypass switches B1, B2, and when not inhibited gate pulse generator 32 produces gating signals for the bypass switches.

In summary, the solid state switches connected to one or more voltage injection transformer windings in a synchronously operated solid state step voltage regulator or load tap changing transformer are conductive for a variable number of half cycles in a base time interval. Consequently, a variable portion of the full value of the voltage associated with the voltage injection winding averaged over a selected base time interval is inserted or removed from the circuit as determined by time ratio control principles, and the increase in step changes over the base time interval is made without increasing the number of switches. By rendering the switches conductive for full cycles within the base time interval, rather than half cycles, there is no DC component in the voltage injecting transformer. The permissible length of the base time interval is dependent upon the nature of the load. The invention is also applicable to other alternating current adjustable output voltage equipment such as an alternator.

While the invention has been shown and described with reference to several preferred embodiments thereof, it will be understood by those skilled in the art that the foregoing and other changes may be made therein without departing from the spirit and scope of the invention.

What I claim as new and desire to secure by Letters Patent of the United States is:

1. An alternating current adjustable output voltage circuit connected between input and output terminals including a plurality of bidirectional conducting solid state switching means and at least one voltage-injecting winding, and coupling means for connecting said solid state switching means to fixed points on said voltage-injecting winding and for effectively inserting said winding in series with one output terminal and removing said winding from the circuit to thereby selectively inject full value and zero voltage increments in series with the input voltage to change the output voltage, characterized by
   time ratio means for synchronously switching said bidirectional solid state switching means, said time ratio means including means for continuously producing a base time interval that is an integral number of half cycles of the input voltage and further including means for effectively inserting said voltage-injecting winding in series with the output terminal for a variable number of half cycles of each base time interval,
   whereby over the base time interval a selected portion of the full value voltage increment is injected in series with the input voltage,
   wherein said circuit includes one voltage-injecting stage comprising a voltage-injecting winding and solid state switching means operated according to time ratio principles to inject a variable portion of the full value voltage increment when averaged over the base time interval and another voltage-injecting stage that is operated to selectively inject only a full value voltage increment and a zero value voltage increment over the entire base interval.

2. A circuit according to claim 1 wherein said adjustable output voltage circuit is a step voltage regulator constructed with solid state switches.

3. A circuit according to claim 1 wherein said adjustable output voltage circuit is a load tap changing transformer constructed with solid state switches.

4. In a solid state voltage regulator connected between input and output terminals including a plurality of bidirectional conducting solid state switching means and at least one voltage-injecting transformer stage having a shunt exciting winding and an inductively coupled secondary winding, and coupling means for connecting said solid state switching means to fixed points on said secondary winding and for effectively inserting said secondary winding in series with one output terminal and for removing said secondary winding from the circuit to selectively inject full value and zero voltage increments synchronously in series with the input voltage to change the output voltage, the improvement which comprises a time ratio synchronous gating circuit for said solid state switching means, said time ratio synchronous gating circuit including means for continuously producing a base time interval that is an integral number of half cycles of the input voltage and further including means for effectively inserting said secondary winding in series with the output terminal for a variable number of half cycles of each base time interval, whereby over the base time interval a selected portion of the full value voltage increment is injected in series with the input voltage, said circuit comprising one voltage-injecting transformer stage operated according to time ratio principles to inject a variable portion of the full value voltage increment when averaged over the base time interval and another voltage-injecting transformer stage operated to selectively inject only a full value voltage increment and a zero value voltage increment over the entire base time interval.

5. A circuit according to claim 4 wherein said time ratio synchronous gating circuit is operative to effectively insert said secondary winding in the circuit for a variable number of complete cycles of the base time interval.

6. An alternating current adjustable output voltage circuit connected between input and output terminals including a voltage-injecting transformer having a shunt exciting winding and an inductively coupled secondary winding, a pair of bidirectional conducting solid state switches respectively connected to fixed spaced points on said secondary winding, and coupling means for effectively inserting said secondary winding in series with one output terminal and for removing said secondary winding from the circuit to selectively inject full value and zero voltage increments synchronously in series with the input voltage to change the output voltage, characterized by a time ratio synchronous gating circuit for said solid state switches including means for continuously producing a base time interval that is an integral number of half cycles of the input voltage and further including means for effectively inserting said secondary winding in series with the output terminal for a variable number of half cycles of each base time interval, said time ratio synchronous gating circuit being operative to insert a selected fractional portion of the full value voltage increment in series with the input voltage when averaged over each base time interval in addition to the full value and zero voltage increments.

7. A circuit according to claim 6 wherein said coupling means includes a series transformer having a primary winding connected in series with the output terminal and an inductively coupled secondary winding effectively connected in series with said voltage-injecting transformer secondary winding by operation of said solid state switches.

8. A circuit according to claim 6 wherein said time ratio synchronous gating circuit effectively inserts said voltage-injecting transformer secondary winding in the circuit for a variable number of complete cycles of the base time interval.